Patented July 10, 1951

2,559,685

UNITED STATES PATENT OFFICE 2,559,685

METHOD OF TREATING CITRUS FRUIT PULP LIQUOR

Boris T. Sokoloff and James B. Redd, Lakeland, Fla.

No Drawing. Application September 14, 1948, Serial No. 49,294

7 Claims. (Cl. 99—6)

This invention relates to the production of citrus molasses which, as at present produced, is largely if not wholly a by-product of the citrus fruit canning industry. When citrus fruit is canned the discarded pulp, while still fresh, is generally treated with lime to facilitate the separation therefrom of its contained water which, together with its water-soluble substances, is then pressed out and recovered as so-called "press-liquor," while the remainder of the pulp, called "press cake," is used for animal feed. The press-liquor so recovered is evaporated, in vacuo, to a sweet brownish syrup which, though richer in nutritive value than the press cake, is objectionable for feed purposes on account of its extremely bitter after-taste.

The chief nutritive constituents of citrus molasses are the simple sugars which are normally present therein to an extent of from 40 to 50%; and, besides these sugars the molasses generally contains from 3.5 to 5.3% mineral salts (partially due to the lime added, as aforesaid, to the fresh citrus pulp to facilitate the extraction of the press liquor) and from 3.4 to 5.0% protein matter, together with very small amounts of other substances, particularly glucosides which give the sweet syrup its very bitter after-taste. The presence of mineral salts in the press-liquor not only makes the processing of this liquor into molasses difficult since, when the heated liquor is passed through the tubes of the processing apparatus, these salts precipitate and clog the tubes, but they also make it difficult to obtain from the press-liquor a molasses of uniform composition. And the presence of the glucosides or substances causing the bitter after-taste not only renders the product unsuitable for human consumption but to a greater or less extent objectionable for use as animal feed even when admixed in small quantities with other animal feed.

The object of this invention is to eliminate or substantially eliminate the bitter after-taste from the molasses and to accomplish this without harmful effects on the liquor itself or the molasses obtained therefrom. So far as we are aware, the various physical and/or chemical expedients heretofore suggested for this purpose have not been successful; and this we believe to be due to the fact that the liquor may be injuriously affected by such physical factors as excessive heat or cold, or by the addition of substances thereto which change its viscosity or increase or decrease its normal pH value.

As a preliminary step of the process constituting our invention, we treat the press-liquor with a product of Spanish moss. Spanish moss (*Tillandsia usneoides*) is an epiphyte deriving, as it does, all of its nourishment from the air. Retted and dried, Spanish moss is now used largely, if not wholly, for upholstery purposes, although due to its relatively high (about 11.5%) protein content, it has been suggested that it might be used as an ingredient of cattle rations. And it was from that angle that we first began the investigation of this plant to determine its vitamin content, which we found to be relatively high in thiamin, riboflavin, and niacin, though relatively poor in carotene. We also found it to contain considerable amounts of a waxy substance and lignin-like material. By treating citrus press-liquor with the dried and pulverized residue of Spanish moss left after a water extraction of its solubles, said residue will absorb and thereby remove from the press-liquor practically all of the mineral salts present in the liquor together with other substances such as its protein content and the small amount of its contained fat, but will leave substantially unaffected and unchanged practically all of the sugar of the liquor.

The preparation of this dry powdered residue from the moss may be effected, for example, as follows: 100 grams of the moss are first washed in cold water to remove dust. It is then macerated and kept in hot water at a temperature of about 90 degrees F. for about one hour, then removed from the water, dried and pulverized. Of the 100 grams of moss treated in this manner about 84.5 grams of the powder are obtained.

In using this powder, in accordance with our invention, the citrus press-liquor may be processed into citrus molasses by employing, for example, the following procedure: the press-liquor is passed over a vibratory screen of, say 60 mesh and, through a heater at 220 to 230 degrees F., into a precipitation tank. The powder is then added to the liquor in the tank in an amount, say, from 3 to 5% of the weight of the liquor, that is to say, for 1000 grams of the liquor, 30 to 50 grams of the powder are added. The liquor is then agitated for, say, at least 30 minutes and then left to stand and settle for about 3 hours. The settlings which have come down are then separated from the liquor by centrifuging or filtration, after which the liquor is transferred to evaporators for reduction into citrus molasses in the conventional manner. The molasses so obtained will be substantially free of all proteins, fat and mineral salts which were theretofore present in the liquor, and will consist substantially of sugars, glucosides and water. The bitter after-taste so typical of citrus molasses will however still be present at this stage though perhaps in a lesser degree.

To eliminate the bitter after-taste from the molasses, the glucosides thereof or other substances to which it is due are dissolved out by treating the molasses with a solvent comprising a mixture of absolute (waterless) iso-propyl alcohol and anhydrous lactic acid (dilactide); and then the molasses is separated from the solvent by centrifuging or by a separatory funnel, the molasses and the solvent being immiscible. By way of example, this step may be carried out as follows: 100 grams of iso-propyl alcohol to which 2 grams of the anhydrous lactic acid have been added, are mixed with 100 grams of citrus molasses preferably produced as aforesaid. This mixture is shaken for about 15 to 20 minutes and then left to stand for another 15 to 20 minutes or so to permit complete infusion to occur, whereupon the two immiscible liquids present are separated by centrifuging or by the use of a separatory funnel. After separation, one of these liquids, the alcoholic anhydride solution, will be found to contain all of the glucosides and/or other substances which cause the bitter after-taste, together with a small amount of sugar, while the other liquid, the molasses, which now has been deprived of all substances which give it a bitter after-taste, will be found to be completely free of all traces thereof. Since the glucosides which by themselves are soluble in the alcohol, have a pronounced tendency to form complex molecules with protein as well as with sugar, their extraction is greatly facilitated by splitting these molecules; and it is for this purpose that the lactic acid is added to the alcohol. Moreover, the anhydrous form of the acid is preferred since, to the extent that all water is excluded from the solvent, the more complete and effective is the extraction of the glucosides. Indeed, the alcohol alone will dissolve and separate some of the glucosides of the molasses, even without the addition of the acid. While this step of extracting the glucosides may be applied to eliminate the bitter after-taste from citrous molasses however produced, it is particularly effective when applied to molasses which has been freed from all salts, proteins and fats in the manner aforesaid, since none of these substances will then be present to react with the glucosides to form complex molecules. It is also possible to use acetone as a solvent in place of the alcohol; but inasmuch as the subsequent separation of the solvent from the molasses when acetone is used, is more difficult and costly, the use of the alcohol is preferred.

So far as the removal of the mineral salts (calcium) content of the press-liquor is concerned, we do not consider that our invention is necessarily restricted to the treatment of the liquor with Spanish moss from which the water solubles have been extracted, since the moss in its natural condition is to a degree effective for this purpose. But we prefer to use the residue described aforesaid since the water solubles of the moss will not then be added to the finished molasses. In other words, the finished molasses will then be nearly normal citrus molasses. The said water solubles, however, are not harmful to the molasses; in fact, containing as they do useful vitamins, their addition to the molasses could be regarded as beneficial.

We claim as our invention:

1. A process for reducing the bitter after-taste of citrous molasses, which comprises adding absolute iso-propyl alcohol to the molasses to dissolve the glucosides, agitating the mixture of molasses and alcohol, and then removing the alcohol from the molasses.

2. A process for eliminating the bitter after-taste of citrus molasses, which comprises treating the molasses with an organic solvent for glucosides and containing lactic anhydride, agitating the mixture of molasses and solvent, and then removing the solvent from the molasses.

3. The process of eliminating the bitter after-taste of citrus molasses, which comprises treating the molasses with a solvent comprising iso-propyl alcohol and lactic anhydride, agitating the mixture of molasses and solvent, and then removing the solvent from the molasses.

4. The process of claim 3 in which the agitation of the mixture of molasses and solvent is continued for about 15 to 20 minutes and then left to stand for about another 15 to 20 minutes before the solvent is removed from the molasses.

5. The process of claim 3 in which the ratio of the lactic anhydride to the alcohol in the solvent is about 1 to 50.

6. A process for treating citrus press-liquor, comprising: removing therefrom substantially all of its contained mineral salts, evaporating the salt-free liquor to a syrup, treating the syrup with a solvent comprising iso-propyl alcohol and lactic anhydride, and then removing the solvent from the syrup.

7. The process of claim 6 in which the removal of the mineral salts from the press-liquor is effected by treating the liquor with the dry powdered residue of Spanish moss.

BORIS T. SOKOLOFF.
JAMES B. REDD.

REFERENCES CITED

The following references are of record in the file of this patent:

UNITED STATES PATENTS

| Number | Name | Date |
|---|---|---|
| 1,141,458 | Gore | June 1, 1915 |
| 1,961,714 | Skazin | June 5, 1934 |
| 2,297,503 | Rudolph | Sept. 29, 1942 |